United States Patent [19]

Peters et al.

[11] Patent Number: 4,869,555

[45] Date of Patent: Sep. 26, 1989

[54] APPARATUS FOR RECOVERY OF SULFUR

[75] Inventors: John R. Peters, Pecos, Tex.; Max E. Ramey; Arturo E. Seyffert, both of Carlsbad, N. Mex.; Jack L. Canon, Pecos, Tex.; Michael W. Robinson, Pecos, Tex.; William T. Abercrombie, Pecos, Tex.

[73] Assignee: Pennzoil Sulphur Company, Houston, Tex.

[21] Appl. No.: 141,229

[22] Filed: Jan. 6, 1988

[51] Int. Cl.[4] .................. E21B 43/00; E21B 43/40; E21C 41/14

[52] U.S. Cl. ........................................ 299/7; 299/4; 299/6

[58] Field of Search ................. 299/4, 5, 6, 7; 210/702, 805, 806, 804

[56] References Cited

U.S. PATENT DOCUMENTS

| | | |
|---|---|---|
| 461,429 | 10/1891 | Frasch .................. 299/7 X |
| 461,430 | 10/1891 | Frasch . |
| 799,642 | 9/1905 | Frasch . |
| 800,127 | 9/1905 | Frasch . |
| 870,620 | 11/1907 | Frasch . |
| 928,036 | 7/1909 | Frasch . |
| 977,444 | 12/1910 | Frasch . |
| 988,995 | 4/1911 | Frasch . |
| 1,008,319 | 11/1911 | Frasch . |
| 1,152,499 | 9/1915 | Frasch . |
| 1,184,649 | 5/1916 | Huff . |
| 1,259,537 | 3/1918 | Lucas et al. . |
| 1,401,593 | 12/1921 | Drachenberg . |
| 1,602,475 | 10/1926 | Andrews . |
| 1,612,453 | 12/1926 | Lundy et al. . |
| 1,615,050 | 1/1927 | Stewart .................. 299/6 |
| 1,615,051 | 1/1927 | Stewart . |
| 1,628,873 | 5/1927 | Drachenberg . |
| 1,648,210 | 11/1927 | Andrews . |
| 1,673,879 | 6/1928 | Lundy et al. . |
| 1,700,995 | 2/1929 | Burns et al. . |
| 1,719,981 | 7/1929 | Judson . |
| 1,750,136 | 3/1930 | Schroeder . |
| 1,764,538 | 6/1930 | Stewart .................. 299/4 |
| 1,814,539 | 7/1931 | Andrews . |
| 1,846,358 | 2/1932 | Reed . |
| 1,878,158 | 9/1932 | Lundy et al. . |
| 2,038,757 | 4/1936 | O'Donnell . |
| 2,091,829 | 8/1937 | Nelson .................. 299/7 X |
| 2,109,611 | 3/1938 | Axelrad . |
| 2,137,619 | 11/1938 | Lee . |
| 2,493,413 | 1/1950 | McIver et al. . |
| 2,754,098 | 7/1956 | Heinze . |
| 2,756,035 | 7/1956 | Axelrad et al. .................. 299/6 |
| 2,756,208 | 7/1956 | Axelrad et al. . |

(List continued on next page.)

OTHER PUBLICATIONS

Sulphur, Pennzoil Company, Oct. 1986.

Sulphur, The British Sulphur Corporation Limited, No. 184, May-Jun. 1986.

Primary Examiner—Stephen J. Novosad
Attorney, Agent, or Firm—Lowe, Price, LeBlanc, Becker & Shur

[57] ABSTRACT

Elemental sulfur in substantially pure form is recovered from an underground sulfur formation which has been previously been mined by the Frasch process by injection of hot water into the underground formation to melt at least a portion of the sulfur, removing the resulting mixture of sulfur and hot water to the surface, separating the mixture of sulfur and hot water, recovering the sulfur as molten sulfur, and recycling the water to the underground formation. In alternatives, the water may be treated with additives to prevent corrosion, and scale and to reduce hardness and enhance separation of sulfur and water. The process is practiced using a conventional Frasch sulfur well in combination with a bleed water well and/or injection well. Also provided is a method and apparatus for separating molten sulfur from a mixture of molten sulfur and water.

7 Claims, 4 Drawing Sheets

U.S. PATENT DOCUMENTS

| | | |
|---|---|---|
| 2,771,284 | 11/1956 | Monroe, Jr. . |
| 2,783,986 | 3/1957 | Nelson et al. . |
| 2,784,954 | 3/1957 | Ilfrey . |
| 2,808,247 | 10/1957 | Parks .................................. 299/6 |
| 2,808,248 | 10/1957 | Prokop et al. . |
| 2,817,504 | 12/1957 | Axelrad . |
| 2,847,201 | 8/1958 | Ebarb, Sr. ............................. 299/6 |
| 2,850,271 | 9/1958 | Dykstra . |
| 2,896,931 | 7/1959 | Marquis . |
| 2,896,932 | 7/1959 | Marquis ................................ 299/6 |
| 2,917,345 | 12/1959 | Phillips, Jr. et al. . |
| 2,937,624 | 5/1960 | Brogdon, Jr. . |
| 2,947,690 | 8/1960 | Axelrad . |
| 2,991,987 | 7/1961 | Heinze . |
| 3,041,274 | 6/1962 | Love et al. . |
| 3,432,205 | 3/1969 | Hottman et al. ........................ 299/4 |
| 3,464,885 | 9/1969 | Land et al. . |
| 3,578,418 | 5/1971 | Cantrell et al. . |
| 3,620,571 | 11/1971 | Billings . |
| 3,623,770 | 11/1971 | Ayres et al. . |
| 3,630,573 | 12/1971 | Goddin, Jr. et al. . |
| 3,717,703 | 2/1973 | Pekzerski et al. . |
| 3,718,366 | 2/1973 | Hill . |
| 4,051,889 | 10/1977 | Stoddard . |
| 4,059,156 | 11/1977 | Berg . |
| 4,123,107 | 10/1978 | Bryant, Jr. et al. . |
| 4,124,253 | 11/1978 | Latiolais et al. . |
| 4,156,545 | 5/1979 | Blanchard, Jr. et al. . |
| 4,157,847 | 6/1979 | Williams et al. . |
| 4,222,897 | 9/1980 | Rollmann . |
| 4,241,953 | 12/1980 | Bradford et al. ................... 299/6 X |
| 4,249,775 | 2/1981 | Zakiewicz .......................... 299/6 X |
| 4,413,859 | 11/1983 | Folk . |
| 4,784,754 | 11/1988 | Fong et al. ......................... 210/702 |

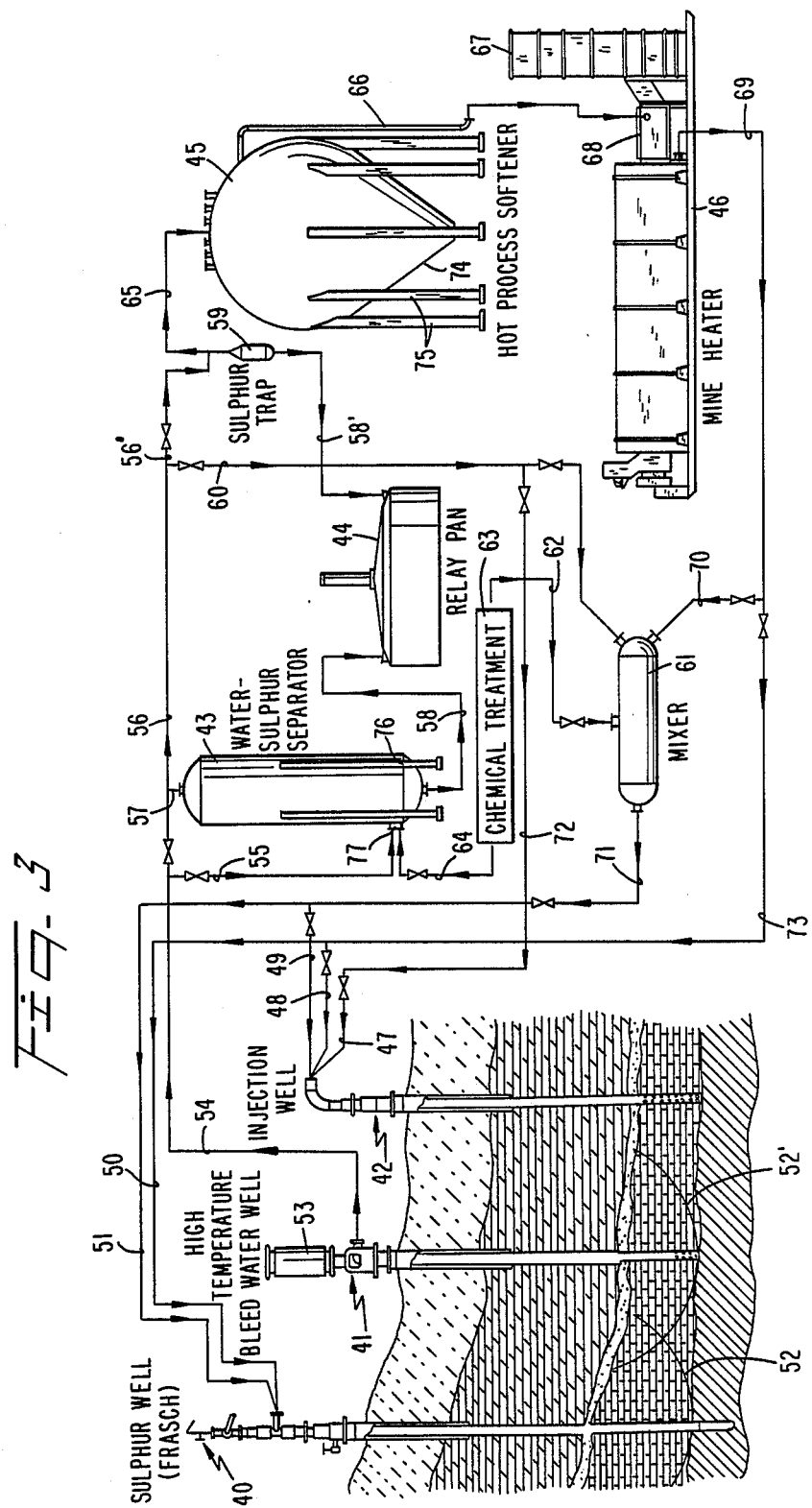

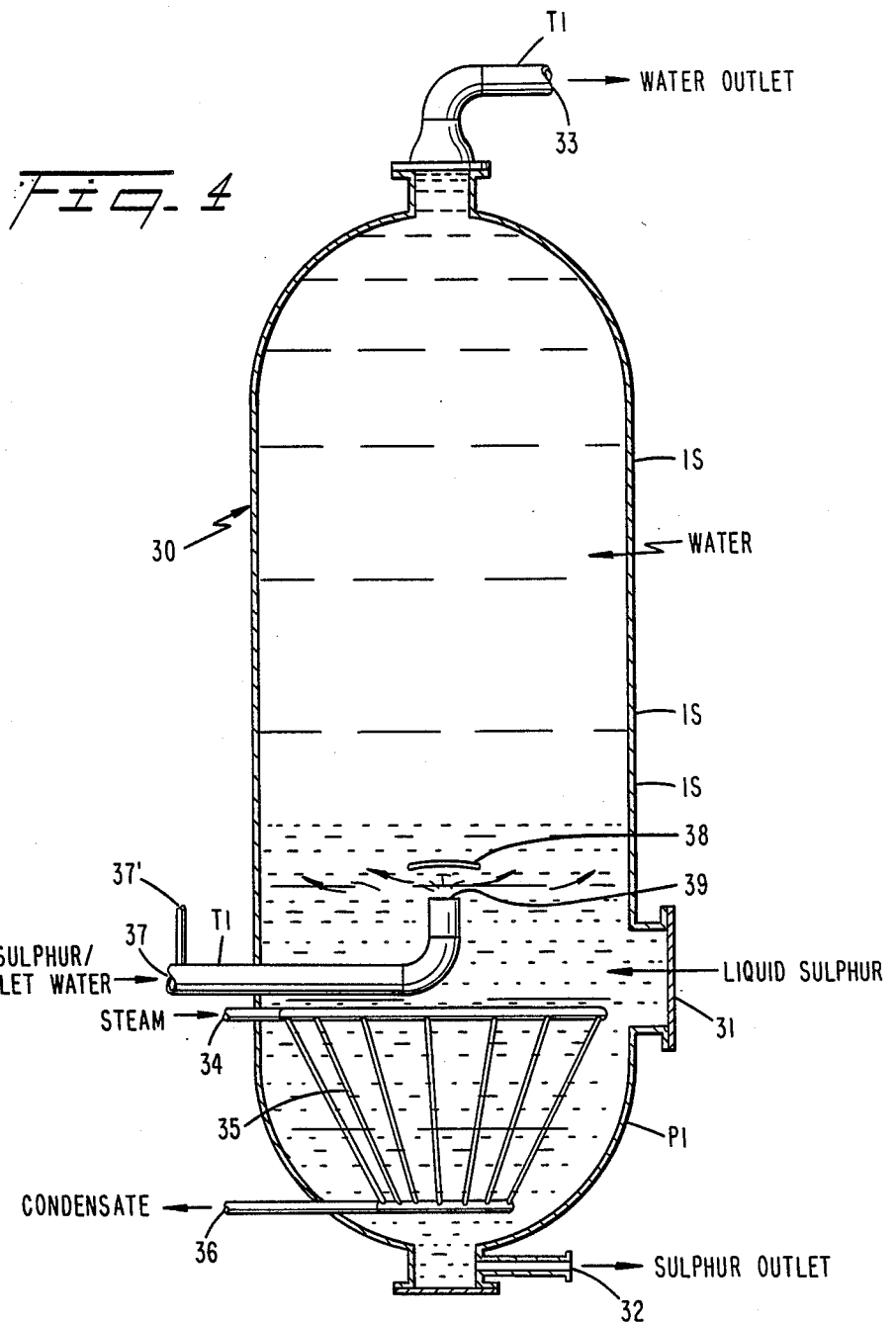

APPARATUS FOR RECOVERY OF SULFUR

FIELD OF THE INVENTION

This invention relates to methods and apparatus for the recovery of sulfur from underground formations and more particularly relates to the secondary recovery of sulfur from a formation which has been previously mined by the Frasch mining process.

BACKGROUND

Processes for the mining of sulfur by the Frasch method have been known for many years. The process which was developed about 1890 by Herman Frasch, provides a process for recovering sulfur from subterranean deposits by heating vast quantities of water to about 320° F. and pumping this water down wells into the sulfur formation. The heated water fuses the sulfur in the formation such that the sulfur can be lifted to the surface in the liquid state by conventional methods, such as with an air lift. Several United States patents were obtained by Frasch on this process, including U.S. Pat. Nos. 461,429, 461,430, 799,642, 800,127, 870,620, 928,036, 977,444, 988,995, 1,008,319, and 1,152,499.

The Frasch process primarily concerns the recovery of sulfur from a pristine field from which up to about 70% of the total reserves can be recovered. Once the primary recovery is competed, however, there remains substantial quantities of sulfur in the formation. There has been substantial published prior art seeking ways to recover the additional sulfur. For example, the prior art has used combinations of a sulfur well with a bleed well in attempts to recover additional sulfur. Disclosures of this type of system may be found in U.S. Pat. Nos. 1,615,050, 1,615,051, 1,719,981, 1,764,538, 2,991,987, and 3,041,274. The bleed well, however, is simply used in this system to discharge or recover water from the sulfur formation.

Later work in this area includes U.S. Pat. No. 2,109,611, a 1938 patent, which reuses mine bleed water in a process for sulfur recovery. However, there is no disclosure in the patent for treatment of the water to recover sulfur. U.S. Pat. No. 2,771,284, a 1956 patent, removes sulfur deposits from sulfur mining pipes using a hot caustic soda solution. U.S. Pat. No. 2,917,345, a 1959 patent, is directed to a method for producing a sulfur slurry for transportation of solid sulfur. In this patent the process includes mixing molten sulfur produced by the Frasch process with cold water in a dispersing or grinding machine to produce a slurry. U. S. Pat. No. 3,578,418, a 1971 patent, is directed to a solvent extraction process for recovering sulfur from ores. U.S. Pat. No. 3,718,366, a 1973 patent, is directed to a method for creating permeability in sulfur deposits by underground fusion mining of sulfur using a modified Frasch process. According to this process, the rate of production of molten sulfur is increased by increasing the permeability of the sulfurcontaining formation by creating a fracture between the producing well and the bleed well using an explosive. However, this patent does not recover sulfur from the bleed well.

U.S. Pat. No. 4,241,953, a 1980 patent, discloses methods for reuse of sulfur mine bleed water wherein the underground water is brought to the surface, mixed with fresh heated water and returned underground to met the subterranean sulfur using a return pipeline which is separate and distinct from the pipeline through which the molten sulfur is brought to the surface.

The present invention provides a sulfur recovery system wherein primary, secondary and tertiary sulfur recovery is made possible to greatly increase the amount of sulfur that can be obtained from the formation.

SUMMARY OF THE INVENTION

It is accordingly one object of the present invention to provide methods for the secondary and tertiary production of sulfur from partially exhausted underground sulfur zones.

It is a further object of the present invention to provide a method by which enhanced recovery of sulfur may be achieved by formation of a liquid sulfur/water mixture and then recovering the sulfur from the mixture.

A still further object of the present invention is to provide a method and apparatus for the secondary and tertiary recovery of sulfur from partially exhausted underground sulfur zones wherein the sulfur is melted by contact with water maintained at a temperature greater than the melting point of sulfur, the mixture of water and sulfur is returned to the surface, and the sulfur is separated from the water and recovered.

An even further object of the invention is to provide a method and apparatus for the recovery of sulfur from a mixture of water and molten sulfur.

Other objects and advantages of the present invention will become apparent as the description thereof proceeds.

In satisfaction of the foregoing objects and advantages, there is provided by the present invention a method for the secondary and tertiary recovery of sulfur from an underground partially exhausted sulfur zone, the process comprising (a) injecting hot water into the sulfur zone, the hot water being at a temperature higher than the melting point of sulfur, (b) permitting the hot water to contact the sulfur and cause at least a portion of the sulfur to melt and mix with the water, (c) removing the mixture of sulfur and water to the surface and passing to a separation device, (d) recovering molten sulfur, and (e) recovering and recycling the hot treated water for reuse in the sulfur zone.

Also provided by the present invention is an apparatus in combination for the secondary and tertiary recovery of sulfur from a partially exhausted underground sulfur zone comprising (a) means providing access to said sulfur formation, including means for injecting hot water into said sulfur formation to contact the sulfur in the sulfur zone and melt at least a portion of the sulfur and form a liquid sulfur/water mixture; (b) means for removing said sulfur/water mixture to the surface; (c) means for separation of the water-sulfur mixture and recovering molten sulfur from the hot water; and (d) means for recovery of the sulfur and recycling the separated hot water to said underground sulfur zone.

Also provided by the present invention is a method for separating and recovering molten sulfur from a mixture of molten sulfur and water, the method comprising passing the mixture of molten sulfur and water into a vessel, providing a quiescent period for enhancing gravitational settling and separation by density to form an upper layer of water and a lower layer of sulfur, and removing the lower layer of sulfur.

Also provided is an apparatus for separating and recovering molten sulfur from a mixture of molten sulfur and water, the apparatus comprising a vessel, said vessel being provided with means for introduction of a mixture of molten sulfur and water, means to provide a quiescent period to enhance gravitational settling and separation of the sulfur and water by differences in density, means to remove the lower layer which comprises molten sulfur, and means to remove the upper layer which comprises water.

BRIEF DESCRIPTION OF THE DRAWINGS

Reference is now made to the drawings accompanying the application wherein

FIG. 3 is a preferred embodiment of the process of the for recovery of sulfur; and FIG. 4 is a perspective view of a separator to separate molten sulfur from water.

DEFINITIONS

Figure 1:
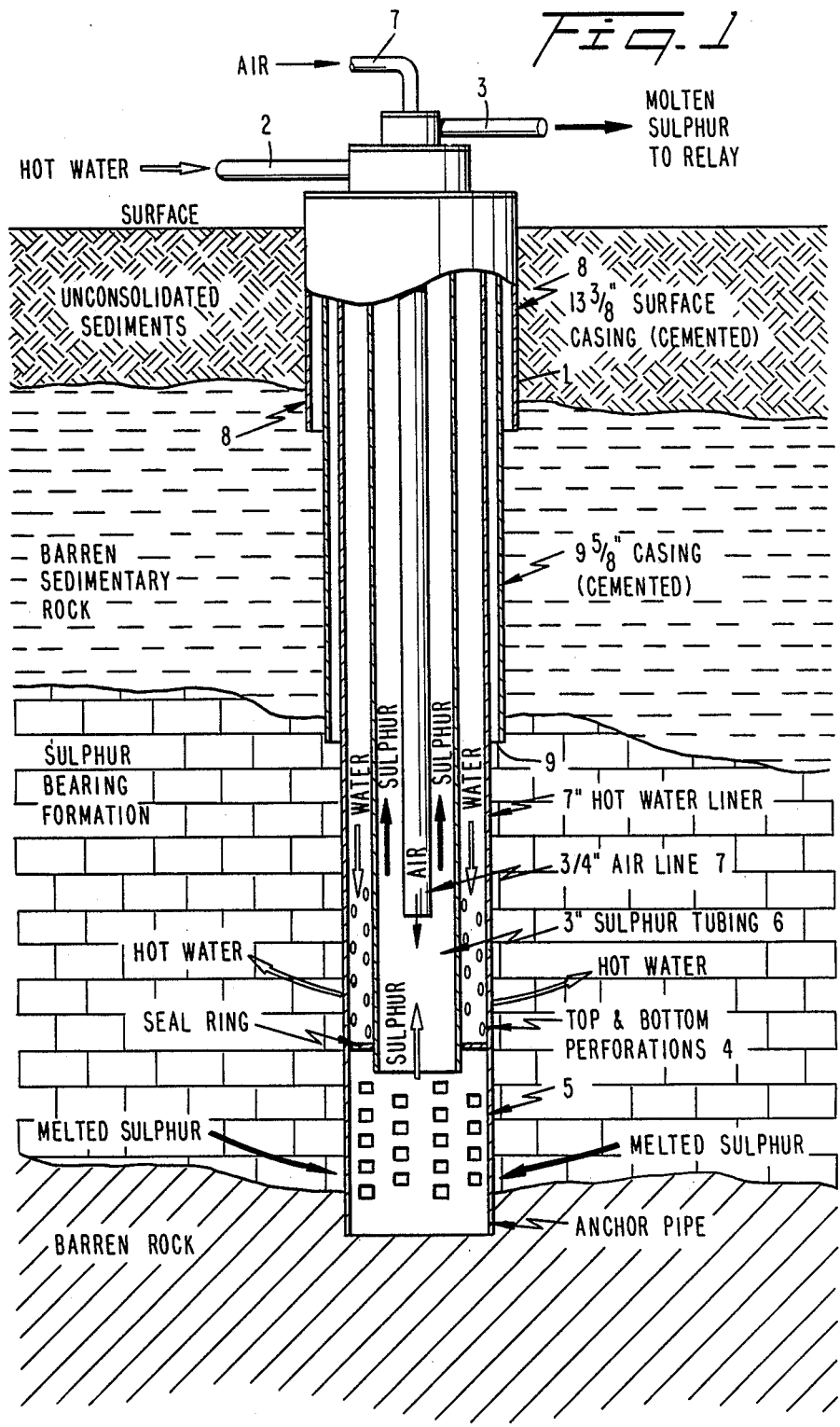
FIG. 1 is a typical Frasch sulfur well production system.

The following terms are used in this patent application.

Pristine production Area—Initial production patterns in a sulfur zone which has never been heated.

Partially Exhausted Zone—A sulfur production area in which the remaining sulfur reserves are confined or concentrated at the base of ore zones and/or in disseminated globules contained in the matrix skeleton throughout the total ore zone.

Exhausted Zone—An area from which all economic reserves have been recovered. This invention may extend recovery up to 95% of the total geological sulfur reserves.

Primary Production—Sulfur production from a pristine area utilizing traditional Frasch methods out of which typically 70% of the total reserves should be recovered.

Secondary Production—Enhanced production from a partially exhausted sulfur zone, out of which an increase to 85% of the total reserves can be expected utilizing a combination of traditional Frasch methods and the methods of this invention contemporaneous with or after primary recovery Tertiary Production—Sulfur production from high temperature bleed waters in a partially exhausted sulfur zone, out of which an increase to 95% of the total reserves can be expected. Tertiary recovery can be obtained contemporaneously with or after primary and secondary recoveries from adjacent areas.

Artificial Lift Well—Surface and/or subsurface equipment and/or procedures required to lift bleed fluids from sulfur formations to the surface.

Free Flow Well—surface and/or subsurface equipment and/or procedures required to control the flow of bleed fluids from a pressurized formation to the surface Warm Bleed Well—A free flowing or artificial lift well, flowing or pumping ambient to 180° F. water Directs pre-heat flow through an ore zone, lowers mine pressure, recycles water, and protects the environment Waters may contain values of free or combined sulfur.

High Temperature Bleed Wells—A free flow or artificial lift well, flowing or pumping 180° F. to 325° F. water from a partially exhausted ore zone. This is mainly a recycle process but the water may contain considerable values of free or combined sulfur Water/Sulfur Separator—An apparatus which allows for the separation of any sulfur which may be intermixed with or dissolved within the recycled high temperature bleed waters.

Sulfur trap—An apparatus which collects any non-suspended sulfur which may be intermixed with the recycled warm and/or high temperature bleed waters.

Chemical Treatment—Any type of additive or chemical treatment which reduces corrosion, conditions water, and/or enhances the water/sulfur separation process.

Mixing Chamber—An apparatus which allows the mixing of bleed waters and other heated water to make up heat loss.

Injection Well (Direct Re-Injection)—Any type of well in which recycled high temperature bleed water at 180° F. to 325° F. is reinjected into a formation containing sulfur to enable or enhance the recovery of sulfur by migrational enrichment to a topographic low or to a low pressure area created by a distant high temperature bleed well.

DESCRIPTION OF PREFERRED EMBODIMENTS

As pointed out above, this invention is concerned with methods and apparatus for the secondary and tertiary recovery of sulfur from an area which has been previously mined by a Frasch sulfur production process. Sulfur is recovered from underground formations by the Frasch process which is the most important process for mining native underground sulfur deposits. The Frasch process is primarily used for efficient recovery of elemental sulfur from large deposits associated with salt domes along the United States Gulf Coast and Mexico and from bedded sulfur deposits in West Texas and other areas. While the Frasch sulfur process has historically been the major source of U. S. sulfur, the depletion of major deposits has reduced the amounts of sulfur obtainable by this process.

The Frasch process is illustrated in FIG. 1 accompanying this application. As shown in the diagram of FIG. 1, in a Frasch sulfur well production system, large quantities of water are heated to 325° F. and pumped into a sulfur-bearing formation. This liquifies the sulfur, which is then lifted to the surface with compressed air. A Frasch sulfur production well as shown in FIG. 1 is drilled with a conventional oil well drilling rig (not shown). Below the surface a series of five concentric pipes 1 is used to pump water into the formation and return the melted sulfur to the surface. This is exemplified by hot water line 2 and sulfur recovery line 3. The outermost pipe, the surface casing 8, extends from the surface to a competent rock layer overlying the formation. A second casing 9 inside the surface casing extends into the top of the sulfur-bearing formation Three of the concentric pipes within the casing extend downward into the sulfur-bearing formation. The outer pipe carries superheated water injected at 2, which is pumped into the formation through first perforations 4 in the pipe wall. As the heated water percolates through the porous rock, the sulfur becomes molten, forms a pool at the bottom of the well, and flows through second perforation 5 into the well. Thereafter, formation pressures move the liquified sulfur a portion of the way up the second of the three concentric pipes 6. Compressed air is then injected through the smallest diameter pipe 7 which then forces the sulfur upward through the pipe to the surface. The liquid sulfur is then recovered at line 3.

Spent water migrates through the underground formation and is removed through bleed water wells in the production area (not shown). This water can then be recycled.

The sulfur is recovered as molten sulfur in a recovery unit or relay. The sulfur may then be pumped to a vat and allowed to solidify or pumped to a molten storage tank.

In the Frasch process the quantity of water needed to produce a ton of sulfur and the cost of energy to heat the water are major economic considerations in the process. Normally Frasch mines in the United States use natural gas as the primary fuel to superheat the water. The cost of heating water is one of the major economic limitations of the Frasch process. The second limitation is that the Frasch process typically recovers only about 70% of the total sulfur reserves in a particular area. The remaining reserves will be confined or concentrated at the base of an ore zone and/or in disseminated globules contained in the matrix skeleton throughout the total ore zone.

The present invention is designed to improve processes in this area so that up to 95% of the total sulfur reserves can be recovered and also provide a method for recycle of the hot water in recovery of these reserves. These objectives are achieved by the method of the present invention which involves the injection of hot water, which can be recycled hot water from the Frasch process, into a well which leads to the sulfur formation. The hot water is at a temperature higher than the melting point of sulfur so that on contact, the hot water causes the sulfur to become molten and thereby forms a mixture of molten sulfur and hot water. This mixture is then recovered from the well and passed to a separation device for separation of the sulfur and hot water. The hot water may then be recovered and recycled for reuse in recovery of additional sulfur while the molten sulfur is recovered and removed to a storage area. The process and apparatus of the present invention are particularly useful to enhance primary production and to recover additional sulfur from a partially exhausted sulfur zone.

The present invention is based on the concept that careful control of the volume and temperature of the injection and bleed water and use of an effective water-sulfur separator will enable one to substantially increase the amount of sulfur which can be obtained from the formation.

Figure 2:
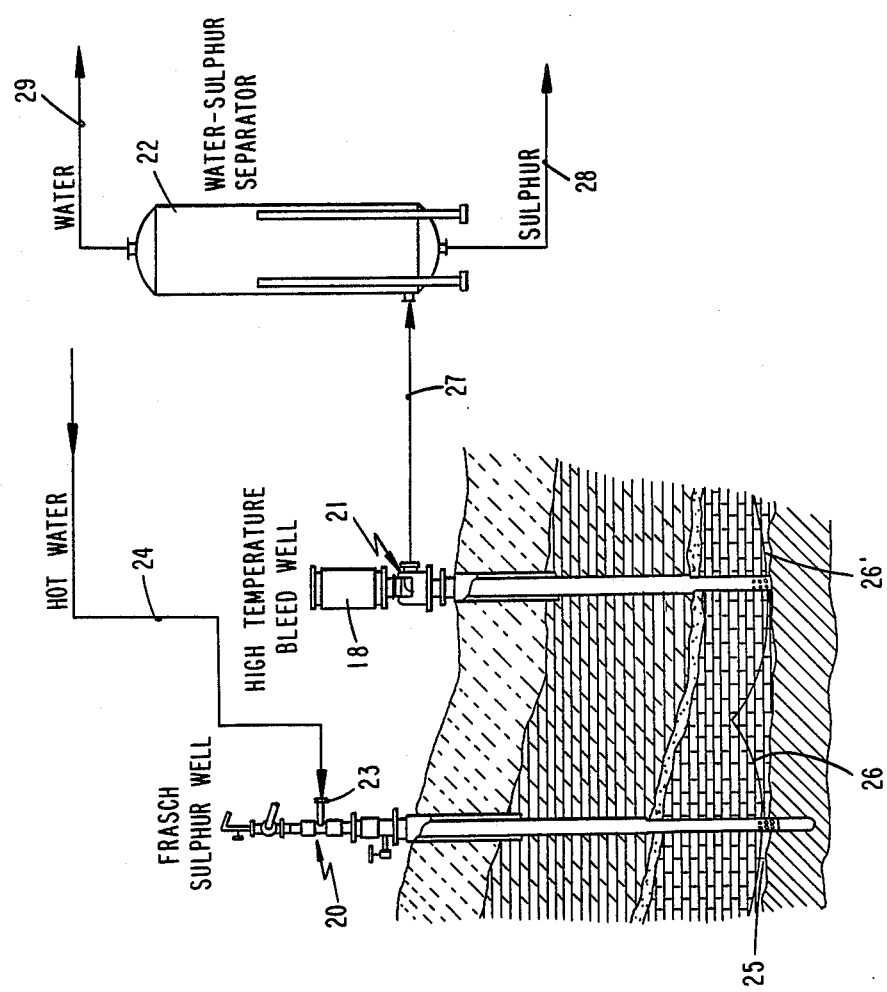
FIG. 2 is a sulfur production process according to a broad embodiment of the invention.

The process of the invention may be practiced using the basic Frasch sulfur production equipment in combination with the systems and equipment set forth in FIGS. 2 and 3 of this application. Basically the process requires the introduction of hot water into the sulfur formation, providing a sufficient residence time for the hot water to contact the sulfur to cause at least a portion of the sulfur to melt and form a mixture of hot water and sulfur, removing the sulfur-water mixture from the formation and effecting a sulfur water separation.

A preferred embodiment of the invention is shown in FIG. 2. In FIG. 2 it will be seen that a combination Frasch sulfur well 20 and a bleed water well 21 are used in combination, together with water-sulfur separator 22. The sulfur well 20 is provided with valve 23 for introduction from line 24 of the hot water at a rate of up to 200 gallons per minute and at the preferred temperature in the range of about 320°-to 325° F.

On injection, the hot water which is introduced under pressure, proceeds downward into the well and contacts the solid sulfur through the perforated sections 25 at the bottom of the casing or liner in the well. It will also be seen that the formation of sulfur at the bottom of the well is generally in the form of depletion cones 26 and 26', these having been formed from the previous process for sulfur recovery using the Frasch system.

In the well the hot water contacts the sulfur and causes melting of the sulfur to form a water-sulfur mixture. This mixture then moves by gravity and pressure differential to the lower portions of the high temperature bleed water well 21. The water-sulfur mixture will then flow into the bleed water well and is removed from the bleed water well through line 27. A pump (not shown) may be maintained in the bottom of the well to lift the water-sulfur mixture from the well. The pump motor is shown at 18 with the shaft extending down to the pump. The mixture removed through line 27 will contain a mixture of molten sulfur and water and will generally contain from 1 to 15% and preferably 0.1 to 50% sulfur by volume. This mixture is pumped to the water-sulfur separator 22 through line 27 at an ideal rate of from about 200–400 gallons per minute Water sulfur separator 22 is a vessel which is heated and insulated so that the sulfur does not solidify.

In the water-sulfur separator, the liquid sulfur, by reason of the difference in density from the water, will form a lower layer and is removed at 28. A sufficient amount of the sulfur is removed by line 28 from the water-sulfur separator to maintain a continuous volume of sulfur within the separator of about one fourth to one half. The water which is the top layer, is then removed through line 29. It is preferred to maintain a layer of water on the sulfur to assist in heating of the sulfur to prevent solidification The water recovered from line 29 is still at an elevated temperature and is preferably reheated and recycled through line 24 for reuse in the process.

A major embodiment of the present invention comprise the process and apparatus for separating and recovering the molten sulfur from the mixture of molten sulfur and water. In this method the mixture of molten sulfur and water is passed into a vessel, in which there is provided a quiescent period to enhance gravitational settling and separation by density. There is thus formed an upper layer of water and a lower layer of molten sulfur. The lower layer of sulfur is then recovered.

The apparatus for separating and recovering molten sulfur from the mixture of molten sulfur and water as described in FIG. 4, comprises a vessel, the vessel being provided with means for introduction of a mixture of molten sulfur and water, means to provide a quiescent period to obtain gravitational settling and separation of the sulfur and water by differences in density, means to remove the lower layer which comprises molten sulfur, and means to remove the upper layer which comprises water. As shown in FIG. 4, the vessel comprises an elongated tank 30, which may be provided with leg supports (not shown). The vessel 30 is provided with an inlet 37 for introduction of the hot sulfur/water mixture There is also provided outlet 32 to remove the molten sulfur at or near the bottom of the vessel and an outlet 33 at or near the top of the vessel to remove hot water.

The vessel is also provided with diffuser or deflector 38 spaced a distance from the termination 39 of inlet line 37. The diffuser may be of any desired configuration and is preferably spaced about eighteen inches from the termination 39 of inlet line 37. This spacing may of course vary depending on vessel size, inlet size and the like. The diffuser or deflector provides one physical means to enhance separation of the sulfur and water and assist in causing settling of the sulfur to form a lower layer in the vessel. It has been discovered that when the sulfur/water mixture enters the vessel at inlet termination 39, the diffuser or deflector serves to redirect the flow to a more lateral direction. This has the result of exposing the sulfur particles within the sulfur/water mixture to greater surface area of molten sulfur thereby enhancing separation. As a result, the sulfur, being of higher density, settles by gravity to the lower portion of the vessel.

In addition, gravitational settling may also be enhanced by the addition of one or more chemical additives through line 37' into inlet 37 to mix with the sulfur/water mixture Chemical additives of this type primarily include surfactants or wetting agents but other chemicals may also be added to the mixture via line 37' such as anti-scale agents and anticorrosion agents to condition the water and/or preserve the equipment. Therefore, the gravitational settling of the sulfur from the sulfur/water mixture is enhanced by physical and chemical procedures.

In order to maintain the necessary temperature in the vessel, steam is introduced at line 34 into steam lines or heating pipe system 35. Condensate is removed at line 36. Inspection flange 31 is provided to inspect, service or clean the vessel.

The ratio of sulfur to be maintained in the vessel preferably ranges from about one-fourth to one-half sulfur to three fourths to one-half water by volume. As shown in vessel 30, the sulfur, being of higher density forms a lower layer and the water forms an upper layer with the stratification occurring just above diffuser 38 as shown.

Monitoring of the system is carried out by the use of the temperature indicators, a pressure indicator, and interphase switches as shown. By use of this system, the proper levels of water and sulfur are maintained in the system to result in good sulfur recovery. The interphase switches detect whether the layer is water or sulfur and adjustments can be made accordingly. In the preferred embodiment, the line of demarcation is maintained between the two interphase switches located just above the diffuser or deflector.

A more comprehensive embodiment of the invention is set forth in FIG. 3. In FIG. 3 there is shown use of the combination of a Frasch sulfur well 40, a high temperature bleed well 41, an injection well 42, and a water-sulfur separator 43 in combination. Other components of this overall system include a relay pan 44, a hot process softener 45, and a heater 46. The sulfur well 40, the high temperature bleed water well 41, and the water-sulfur separator are as described in FIGS. 2 and 4, except for the distinctions described here. In the embodiment of FIG. 3 it will be understood that appropriate valves, pumps and other devices are utilized to provide the necessary flow rates and movement of liquids in the system.

In the embodiment of FIG. 3, the injection of hot water in the Frasch sulfur well 40 is in combination with an injection well 42. The use of the injection well 42 in combination with the sulfur well and high temperature bleed water well 41 provide an opportunity to recover up to 95% of the sulfur contained in the formation. In this system, water is initially injected into injection well 42 from any or all of lines 47, 48 and 49. The hot water at the bottom of the well should be maintained at a temperature of at least 246° F. or above in order to melt the sulfur and is preferably at a temperature in the range of about 250°-330° F., preferably 315°-327° F., and most preferably 320°-325° F. The water in these lines may be heated and/or recycled water as described hereinafter. The hot water is introduced into the injection well 42 under pressure at a rate from 200 gallons per minute up to the pump capacity usually up to about 200 gallons per minute or higher.

Simultaneously heated and/or recycle water is introduced into the Frasch sulfur well through lines 50 or 51. The water is introduced through lines 50 or 51 and pumped into well 40 under pressure at a rate of up to 200 gallons per minute. This water is also at an elevated temperature and preferably at a temperature in the range of about 315°-330° F., preferably at 322°-325° F., most preferably 325° F.

At the bottom of the wells, perforations in the pipes of the sulfur well and injection well permit good contact of the hot water with the remaining sulfur in the formation As may be seen from FIG. 3, the formation at the bottom of sulfur well 40 and bleed water well 41 forms depletion cones at 52 and 52' into which the molten sulfur and water will migrate. Since hot water is being forced into both the sulfur well and the injection well there will be flow of the hot water through the partially exhausted formation which enables the recovery of additional sulfur.

As the water and molten sulfur migrate across the depletion cone, it will flow along to the depletion cones at the lower portions of the high temperature bleed water well. The high temperature bleed water well 41 is provided with an artificial lift at the bottom of the well with a motor 53 driving the lifting device through a shaft extending into the well. The mixture of water and sulfur will flow into the bleed water well. The lift is then used to pump the mixture of water and sulfur out of the bleed water well. The mixture at this point will be at a temperature in the range of 180°-325° F. This mixture of water and sulfur is then removed through line 54 for further processing. In line 54 the mixture of water and sulfur will contain from 0.1%-50% sulfur by volume. The sulfur contained in the water will be substantially pure elemental sulfur, although some additional impurities may be contained therein.

This mixture is then pumped by line 54 at a rate consistent with pump and separator capacities and preferably about 200-400 gallons per minute to the water-sulfur separator.

The mixture of water and sulfur in line 54 is divided and the major portion is pumped through a valve and line 55 to the inlet 77 of water-sulfur separator 43. A portion of the water-sulfur mixture may be pumped through line 56 for processing and recycle of the water as described hereafter.

The mixture in line 55 is pumped into the inlet of the water-sulfur separator 43. Water-sulfur separator 43 is as described in FIG. 4 and generally comprises a vessel provided with supporting legs 76 and means for introduction of the sulfur-water mixture at the inlet as shown. Means are provided at an outlet on separator 43 for removal of water through line 57 to be combined with the mixture in line 56. In the vessel, the sulfur will settle by gravity or other means to the bottom of the vessel as described for FIG. 4. The water will form as an upper layer. It is preferred to maintain a layer of water on the sulfur for efficient operation.

The sulfur is removed via line 58 in a continuous manner and at a rate so as to maintain the preferred volume in the water-sulfur separator.

The sulfur in line 58 is in molten form and is passed to relay pan 44 for storage It will be understood that in a sulfur mining operation, there will be a number of sulfur wells and the process of the invention may be practiced in any of several wells. The sulfur recovered from those wells according to the present process or any other process can then be combined in the relay pan and thereafter either used or prepared for shipping to another location.

The mixture in line 56 which contains water effluent from separator 43, and a portion of the water-sulfur mixture from line 54, is pumped through a valve to line 56' and then pumped into sulfur trap 59. Sulfur trap 59 is a conventional trap in which a further separation of sulfur and water is made by gravity separation. The sulfur is removed from the bottom and passed via line 58' to relay pan 44 to be combined with the other sulfur recovered. A portion of the mixture from line 56 is optionally pumped through line 60 to mixer 61.

Mixer 61 is provisioned for mixing hot bleed water and recycle water and for introducing additives to the operation to prevent corrosion, scaling and the like. Thus, to the water in mixer 61 there may be added a corrosion inhibitor, a scale inhibitor, surfactant or mixture thereof or any other material via line 62 from chemical treatment unit 63. This is an alternative feature of the invention and it will be understood that the chemical treatment provided at this point is for purposes of optimizing the process. The additive may be any corrosion inhibitor, scale inhibitor, surfactant or any other material which will enhance operation of the process The waters to be used in the process of the invention will have their own characteristics depending on origin, other treatments, apparatus used and the like. Therefore the characteristics of the water will dictate the specific chemical additives and the amounts thereof to be introduced to the system at this point. Any of these same chemical additives may be introduced via line 64 into the water-sulfur separator to enhance sulfur recovery and water quality.

The water recovered from sulfur trap 59 is substantially free of sulfur and is passed by line 65 into the hot process softener 45. As may be seen, the hot process softener 45 is preferably a steam heated pressurized tank provided with support legs 75 in which the upper chamber is designed for reaction to soften the water and to permit sludge to settle to the funnelshaped bottom portion 74 of the tank. In actual operation this tank would be of large size so as to be able to handle up to 300,000 gallons of water being processed in a large sulfur mining operation. In the softener, sufficient softening agent such as sodium hydroxide or soda ash, is added so that after treatment the total hardness in the water is about 15-20 ppm calculated as calcium carbonate. It is preferred that the total hardness in the water for reuse in the well be below about 14 ppm total hardness as either calcium or magnesium ion. It is also preferred that this tank be steam heated so that the water is maintained in the range of above 200° F. and preferably at about 220° F. and under pressure. The softener is a softener of conventional commercial design and provides for addition of the softening agent by internal means.

The treated water removed from the hot process softener is passed through line 66 and is at a temperature of preferably above 200° F. and more preferably at about 220-230° F. This heated water is passed to mine heater 46, which is a gas fired mine heater using an open flame or tube in a conventional manner. In the mine heater the water is heated up to about 325° F. for reuse in the system. For economy, attached to the mine heater is a stack economizer 67 which may use the waste gases to preheat the water as it enters the system in convection heating section 68.

The heated water, now at a temperature of about 325° F., is then passed by lines 69 and 73 back to the system. Intermediate to line 73 is a line 70 where at least a portion of the water can be pumped into mixer 61. In mixer 61, mixing and preheating of the water mixture being conditioned for recycle occurs. The mixture can also be treated with additives from line 62 as described. Thereafter the heated water from mixer 61, which contains the appropriate chemical additive(s), is passed by line 71 to line 51 and then pumped into the sulfur well as shown. The primary portion of the water from line 73 is pumped into line 50 and introduced into the sulfur well as shown.

A portion of the heated water from line 73 is optionally pumped into line 48 and introduced into injection well 42 to serve as a portion of the water required for that well. In addition a portion of the water may bypass the mixer 61 and pumped through line 72, and introduced into the injection well 42. Finally, a portion of the treated water from line 71 is optionally pumped via line 49 for introduction into the injection well 42.

By the means described in FIG. 3, once sufficient water is introduced into the underground formation by the sulfur well and by the injection well, the system will operate without the necessity for addition of substantial make-up water. Thus, the water is substantially recycled throughout the overall system, the sulfur is recovered as substantially pure elemental sulfur, and the water is simply processed and recycled. This is a substantial advantage to re-use scarce water and its contained heat.

The following examples are presented to illustrate the invention but it is not to be considered as limited thereto.

EXAMPLE

Operating the equipment and system of FIG. 3, water was injected into the Frasch sulfur well at the rate of 100 gallons per minute at a temperature of 325° F. Simultaneously, bleed water at 280° F. was injected through an injection well as recycle water and treated water. In the formation the water caused melting of sufficient sulfur for the sulfur-water mixture to rise through a bleed water well and was pumped out of that well at the rate of 25 pounds of sulfur per 1,000 gallons of water. The sulfur was substantially pure sulfur. This sulfur-water mixture was pumped at the rate of 400 gallons per minute into a 6,000 gallon water-sulfur separator which was heated by steam and insulated to maintain the sulfur in molten condition. Sufficient sulfur was maintained in the separator so as to occupy about one third the volume of the separator. The molten sulfur was removed from the outlet of the separator and transferred to a relay pan for storage.

The water effluent was removed from the tank, passed through a sulfur trap and the recovered sulfur recycled to the relay pan. The water was then passed to a softener where sufficient reagent was added to bring total hardness for calcium and magnesium ion to below 14 ppm. The water softener was steam heated to maintain the temperature at least above 220° F.

The water was then removed to a heater where it was reheated to 322° F. and then recycled to the system. A portion was cycled o the injection well and the remainder to the Frasch sulfur well.

Using this system, a total of 3,288 tons of high quality elemental sulfur was recovered over a period of 9 ½ months.

The invention has been described herein with reference to certain preferred embodiments. However, as obvious variations thereon will become apparent to those skilled in the art, the invention is not to be considered as limited thereto

What is claimed is:

1. An apparatus in combination for the recovery of sulfur from an underground sulfur formation comprising:
    (a) means for the injection of hot water into contact with said underground sulfur formation, said water being at a temperature higher than the melting point of elemental sulfur;
    (b) means to permit said water and elemental sulfur to remain in contact, so as to melt at least a portion of said sulfur and form a mixture of molten sulfur and water;
    (c) means for removing said mixture of molten sulfur and heated water to the surface; and
    (d) means for separating said water and sulfur mixture to recover molten sulfur and water, said means comprising
        (1) a vessel provided with means for introduction of a mixture of molten sulfur and water;
        (2) means to provide a quiescent period to permit gravitational settling and separation of the molten sulfur and water by differences in density;
        (3) means to heat said mixture within said vessel;
        (4) means to remove the lower layer which comprises molten sulfur; and
        (5) means to remove the upper layer which comprises water; and
    (e) means to recycle said water to said underground formation.

2. Apparatus according to claim 1 wherein the means for injection of water into the sulfur formation comprises a Frasch sulfur well containing a series of concentric pipes extending into said underground formation.

3. Apparatus according to claim 1 wherein the sulfur formation is a formation which has been previously mined by the Frasch process.

4. Apparatus according to claim 1 wherein in the hot water injected into the well is at a temperature in the range of 322°–325° F.

5. Apparatus according to claim 1 wherein additional means is provided to treat the water prior to recycling in step (e) by addition of a chemical additive selected from the group consisting of corrosion inhibitors, scale inhibitors, surfactants, and mixtures thereof.

6. Apparatus according to claim 1 wherein said water and sulfur mixture is removed from the underground formation in step (c) by compressed air means.

7. Apparatus according to claim 1 wherein means are provided for removal of the sulfur and water mixture at the rate of 0.1–50% of sulfur by volume of the sulfur and water mixture being removed from the system.

* * * * *